US010339657B2

(12) United States Patent
Tonouchi et al.

(10) Patent No.: US 10,339,657 B2
(45) Date of Patent: Jul. 2, 2019

(54) CHARACTER DETECTION APPARATUS AND METHOD

(71) Applicant: Kabushiki Kaisha Toshiba, Minato-ku, Tokyo (JP)

(72) Inventors: Yojiro Tonouchi, Tokyo (JP); Kaoru Suzuki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/742,131

(22) Filed: Jun. 17, 2015

(65) Prior Publication Data

US 2015/0371399 A1 Dec. 24, 2015

(30) Foreign Application Priority Data

Jun. 19, 2014 (JP) ................................. 2014-126576

(51) Int. Cl.
*G06T 7/11* (2017.01)
*G06K 9/34* (2006.01)
*G06T 7/187* (2017.01)

(52) U.S. Cl.
CPC ............... *G06T 7/11* (2017.01); *G06K 9/342* (2013.01); *G06T 7/187* (2017.01); *G06K 2209/01* (2013.01)

(58) Field of Classification Search
USPC ......... 345/156, 629; 358/406; 382/112, 182, 382/186; 715/810
See application file for complete search history.

(56) References Cited

U.S. PATENT DOCUMENTS

| 5,949,906 A | 9/1999 | Hontani et al. |
| 7,627,176 B2 * | 12/2009 | Takebe ............... G06K 9/00463 |
| | | 382/176 |
| 7,751,648 B2 * | 7/2010 | Tanaka ..................... G06K 9/38 |
| | | 345/629 |

(Continued)

FOREIGN PATENT DOCUMENTS

| CN | 103425973 A | 12/2013 |
| JP | 8-161421 | 6/1996 |

(Continued)

OTHER PUBLICATIONS

Neumann et al., "Text Localization in Real-World Images Using Efficiently Pruned Exhaustive Search," IEEE Xplore Digital Library (Sep. 2011), pp. Abstract and 1-5.

(Continued)

*Primary Examiner* — Xuemei G Chen
(74) *Attorney, Agent, or Firm* — Finnegan, Henderson, Farabow, Garrett & Dunner, L.L.P.

(57) ABSTRACT

According to one embodiment, a character detection apparatus includes a feature extractor, a determiner and an integrator. The feature extractor extracts a feature value of an image including character strings. The determiner determines each priority of a plurality of different character detection schemes in accordance with character detection accuracy with respect to an image region having a feature corresponding to the feature value. The integrator integrates text line candidates of the character detection schemes, and selects, as a text line, one of the text line candidates detected by the character detection scheme with the highest priority if a superimposition degree indicating a ratio of a superimposed region among the text line candidates is no less than a first threshold value.

12 Claims, 6 Drawing Sheets

(56) References Cited

U.S. PATENT DOCUMENTS

| | | | |
|---|---|---|---|
| 8,947,745 B2* | 2/2015 | Zhao | H04N 1/00331 358/406 |
| 2006/0204103 A1 | 9/2006 | Mita et al. | |
| 2007/0154112 A1 | 7/2007 | Tanaka | |
| 2011/0097002 A1* | 4/2011 | Ishiguro | G06K 9/348 382/229 |
| 2012/0134591 A1* | 5/2012 | Kimura | G06K 9/342 382/185 |
| 2012/0219225 A1* | 8/2012 | Okamoto | G06F 17/30867 382/195 |
| 2013/0251211 A1* | 9/2013 | Palm | G06K 9/00456 382/112 |
| 2014/0143721 A1* | 5/2014 | Suzuki | G06F 3/04842 715/810 |
| 2014/0289619 A1* | 9/2014 | Yamaji | G06F 3/017 715/272 |
| 2015/0139547 A1* | 5/2015 | Yamaji | G06K 9/00416 382/186 |
| 2015/0146985 A1* | 5/2015 | Nakasu | G06K 9/222 382/182 |
| 2015/0154442 A1* | 6/2015 | Takahashi | G06K 9/222 345/156 |
| 2015/0227505 A1* | 8/2015 | Morimoto | G06F 17/2785 704/9 |
| 2015/0302598 A1* | 10/2015 | Collet | G06T 7/0079 382/178 |

FOREIGN PATENT DOCUMENTS

| | | |
|---|---|---|
| JP | 2003-256772 | 9/2003 |
| JP | 2005-309771 | 11/2005 |
| JP | 2006-268825 | 10/2006 |
| JP | 2007-183742 | 7/2007 |
| JP | 2010-186246 | 8/2010 |
| JP | 4587698 | 9/2010 |
| JP | 4901676 | 1/2012 |

OTHER PUBLICATIONS

Lee et al., "AdaBoost for Text Detection in Natural Scene," IEEE Xplore Digital Library (Sep. 2011), pp. Abstract and 1-6.

* cited by examiner

| Condition | First character detection scheme | Second character detection scheme |
|---|---|---|
| brightness variation is small | ○ | × |
| brightness variation is large | × | ○ |

CHARACTER DETECTION APPARATUS AND METHOD

CROSS-REFERENCE TO RELATED APPLICATIONS

This application is based upon and claims the benefit of priority from Japanese Patent Application No. 2014-126576, filed Jun. 19, 2014, the entire contents of which are incorporated herein by reference.

FIELD

Embodiments described herein relate generally to a character detection apparatus and method.

BACKGROUND

With the widespread use of smart phones and wearable devices, there has been a demand for detecting character strings from images existing in real space such as character strings on signboards, signs, and menus in restaurants photographed by a camera. The character strings in images photographed by a camera vary in the way they look depending on the lighting conditions of the character strings and the effects of shadows. As a method of detecting character strings from such images, there are, for example, a technique using a connected component which is obtained by connecting pixels in an image, or a technique using a detector based on mechanical learning.

DETAILED DESCRIPTION

A method using a connected component fails to detect a character string if the connected component is detected incorrectly. Therefore, for example, in the case where the characters and the part of the background are similar colors, or in the case where the colors of characters are changed significantly when reflected or are in shade, the connected component would not be detected correctly, causing the character string to not be properly detected. Furthermore, in the case of using a detector which is based on mechanical learning, since the detection of the character string would depend on the learned data, if a specific logo, a regular handwriting, or an ornamental writing etc. differs significantly from the learned data, the character string would not be detected.

In general, according to one embodiment, a character detection apparatus includes a feature extractor, a determiner and an integrator. The feature extractor extracts a feature value of an image including one or more character strings. The determiner determines each priority of a plurality of different character detection schemes in accordance with character detection accuracy with respect to an image region having a feature corresponding to the feature value. The integrator integrates text line candidates of the character detection schemes, and selects, as a text line, one of the text line candidates detected by the character detection scheme with the highest priority if a superimposition degree indicating a ratio of a superimposed region among the text line candidates is no less than a first threshold value, the text line candidates being obtained as a result of detecting the character string using the plurality of character detection schemes and being a candidate of a region including the character string.

In the following, the character detection apparatus, method and program according to the present embodiment will be described in detail with reference to the drawings. In the embodiment described below, elements specified by the same reference numbers carry out the same operations, and a duplicate description of such elements will be omitted.

Figure 1:
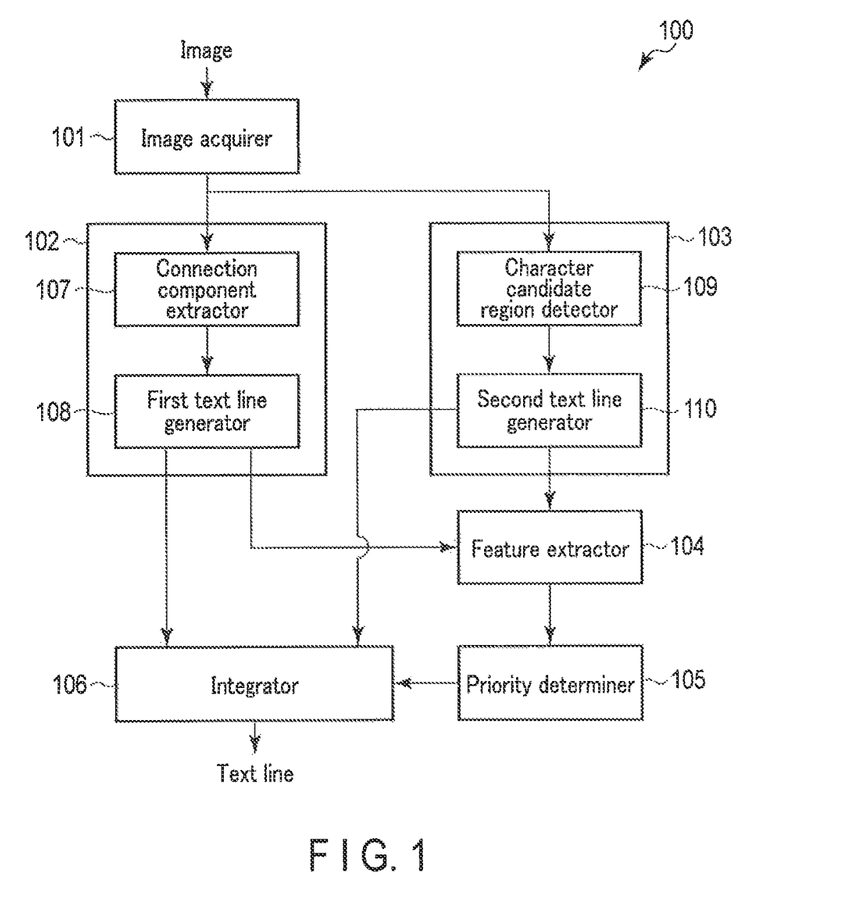
FIG. 1 is a block diagram showing a character detection apparatus.

The character detection apparatus according to the present embodiment will be explained with reference to the block diagram shown in FIG. 1.

The character detection apparatus 100 according to the present embodiment includes an image acquirer 101, a first text line detector 102 (a first detector), a second text line detector 103 (a second detector), a feature extractor 104, a priority determiner 105, and an integrator 106.

The first text line detector 102 includes a connected component extractor 107 and a first text line generator 108. The second text line detector 103 comprises a character candidate region detector 109 and a second text line generator 110.

The image acquirer 101 acquires an image including one or more character strings. Here, the image is assumed to be an image of character strings in real space such as signboards, signs, and menus in restaurants photographed by a camera. However, the image may be any image that includes at least one character string.

The first text line detector 102 receives an image from the image acquirer 101 and uses a first character detection scheme, which is a scheme for detecting a character string, to detect one or more text line candidates (also referred to as a first text line candidate). The text line candidate in the present embodiment is a candidate of a region including a character string, which, for example, is a region expressed by a rectangle, a trapezoid, other quadrangles, or a closed polygon. The text line candidate expressed by a rectangle, a trapezoid, or other quadrangles may be described by coordinate values defining a region, coordinate values of a starting point and an ending point, or the center line and width of the character string etc. In the present embodiment, the character string is assumed to be written horizontally. However, the character string may also be written vertically, in which case the text line would also become a longitudinal region in a vertical direction in line with the direction of the character string.

The second text line detector 103 receives an image from the image acquirer 101 and uses a second character detection scheme which is a scheme different from the first character detection scheme to detect one or more text line candidates (also referred to as a second text line candidate). Since the first text line candidate and the second text line candidate are detected with respect to the same image, the coordinate systems are the same, and the first text line candidate and the second text line candidate will be detected for the same character string.

The feature extractor 104 receives the first text line candidate from the first text line detector 102 and the second text line candidate from the second text line detector 103, respectively, and extracts a feature value of the image. As the feature value of the image, for example, the luminance and the length of the text line may be extracted.

The priority determiner 105 receives the feature value of the image from the feature extractor 104 and determines a priority that indicates which one of the first character detection scheme and the second character detection scheme should be prioritized in accordance with the character detection accuracy with respect to a region in the image (also referred to as an image region) having a feature corresponding to the feature value. The method of determining priority will be explained later on with reference to FIG. 5.

The integrator 106 receives the first text line candidate from the first text line detector 102, the second text line candidate from the second text line detector 103, and the priority from the priority determiner 105, respectively. The integrator 106 selects the first text line candidate and the second text line candidate in accordance with a superimposition degree indicating the ratio of a region in which the first text line candidate and the second text line candidate are superimposed, the feature value of the image, and the priority, and integrates them to generate a text line. Details of the processing executed by the integrator 106 will be explained later on with reference to FIG. 8.

Now, the first text line detector 102 will be explained in detail.

The connected component extractor 107 receives the image from the image acquirer 101 and connects pixels with similar characteristics regarding color information of the pixels, etc. between adjacent pixels among the pixels in the image to generate one or more connected components. Here, the pixels in the image are binarized in white and black. In the case where two or more black pixels among the binarized pixels are adjacent consecutively, a set of consecutive pixels is generated as a connected component.

The first text line generator 108 receives the connected components from the connected component extractor 107, and combines the connected components aligned approximately on the same straight line in accordance with the positional relationship between the connected components and the degree of similarity of the connected components to generate the first text line candidate. Specifically, a feature vector is generated for each of the connected components, and the positional relationship and the degree of similarity of the features between two connected components are defined by the distance of the feature vectors. If the distance of the feature vectors is below the threshold value, the two connected components will be considered as being similar and aligned on the same straight line. Therefore, the two connected components will be connected. As examples of each element of the feature vector, an x-coordinate and y-coordinate expressing the center point of the connected component, an average color of each connected component, and the size (height, width, and length of circumference etc.) of the connected component may be given. The center point may, for example, be the center point of a quadrangle circumscribing the connected component. The text line candidate may also be generated by using the method disclosed in Neumann L., Matas J.: Text Localization in Real-world Images using Efficiently Pruned Exhaustive Search, ICDAR 2011 (Beijing, China) "C. Exhaustive search." The processing executed by the first text line generator 108 above is also referred to as a line detection using a connected component (connected component line detection: CC line detection).

Next, the second text line detector 103 will be explained in detail.

The character candidate region detector 109 receives the image from the image acquirer 101, and having learned the character's image data beforehand, detects the image region having a specific shape to generate a character candidate region. Since the matter of learning the image data is achieved by performing a general learning process, here, the explanation will be omitted.

The second text line generator 110 receives the character candidate regions from the character candidate region detector 109, and combines the connected components, of which the character candidate regions of the same size aligns approximately on the same straight line, to generate the second text line candidate. Here, the processing executed by the second text line generator 110 is assumed as a line detection using the character candidate region.

The detection processing executed by the character candidate region detector 109 will be explained with reference to FIGS. 2 and 3.

Figure 2:
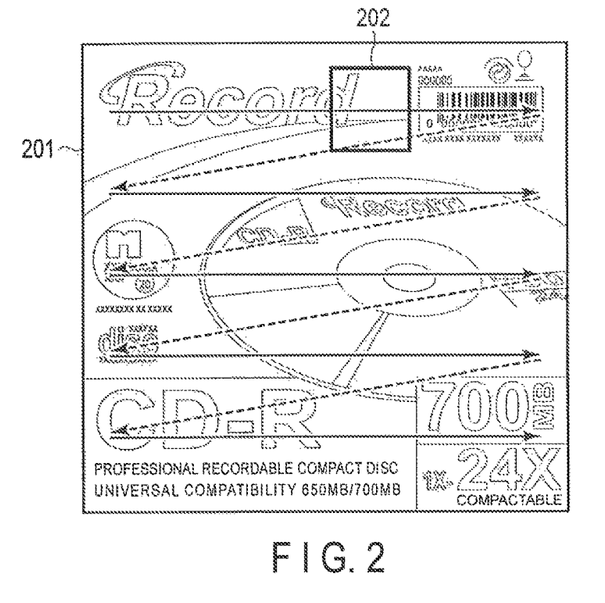
FIG. 2 is a diagram showing a detection processing executed by a character candidate region detector.

As an example of the character candidate region extraction processing, as shown in FIG. 2, scanning is performed by using various sizes of windows 202 for the entire image 201, and the character candidate region presumed as a character in the image 201 is extracted. By changing the size of a window 202, characters in various sizes can be detected as the character candidate region. In other words, even for a character that would not fit in the region of a certain size of window 202, by enlarging the size of window 202, the character would fit in the region of the window 202, thereby enabling the character to be detected as the character candidate region.

Figure 3:
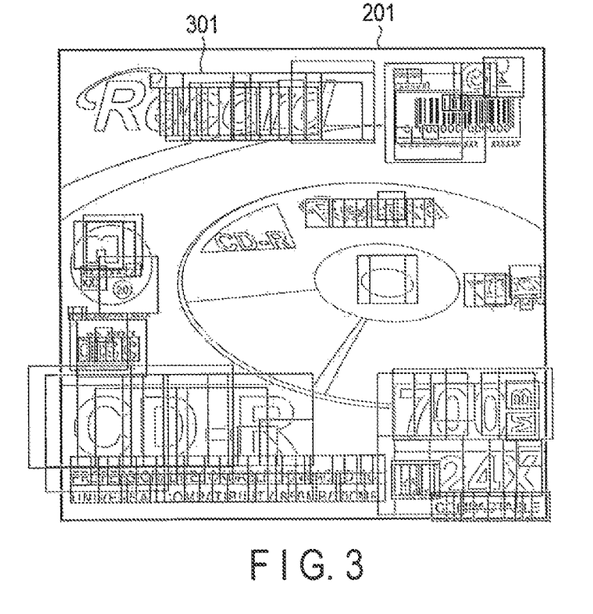
FIG. 3 is a diagram showing a detection result of the detection processing executed by the character candidate region detector.

The result of extracting the character candidate region in the method shown in FIG. 2 is shown in FIG. 3. A character candidate region 301 for the character in the image 201 can be extracted in the manner shown in FIG. 3.

The text line generation processing executed by the second text line generator 110 will be explained with reference to FIG. 4.

Figure 4:
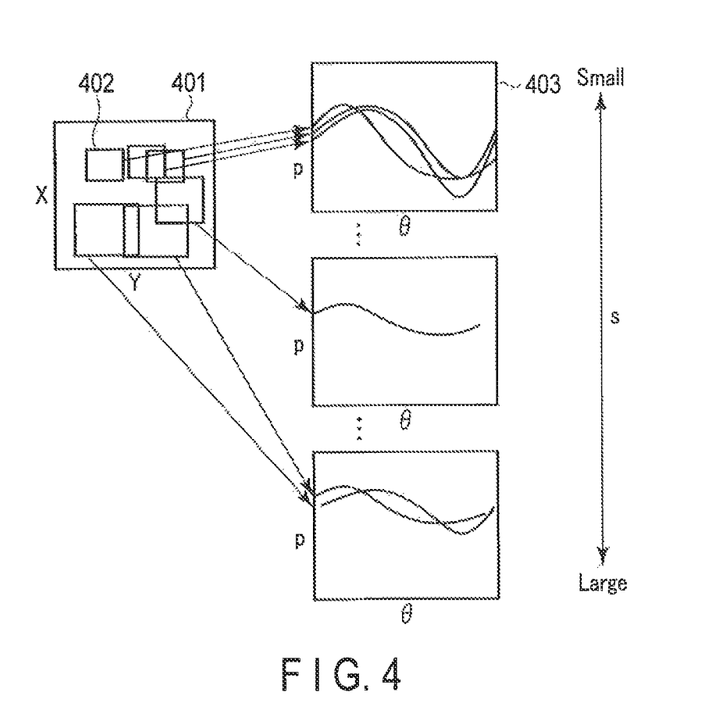
FIG. 4 is a diagram showing a text line generation processing executed by a second text line generator.

FIG. 4 shows a concept of a line detection (Hough line detection) using a Hough transformation. As an image plane 401 showing an image, a coordinate plane in which the vertical axis is x and the horizontal axis is y is assumed. A character candidate region 402 in the image plane 401 is voted to a voting space 403. In the voting space 403, the vertical axis is $\rho$, and the horizontal axis is $\theta$. The space represents a three-dimensional parameter with an a regarding the size of the character candidate region 402. As shown in FIG. 4, in the case where the size of the character candidate region 402 is small, the character candidate region 402 is voted to a voting space where the s is small. In the case where the size of the character candidate region 402 is large, the character candidate region 402 is voted to a voting space where the s is large. A second text line candidate, which sets a coordinate value with the largest number of votes in each voting space as a straight line parameter, is generated.

The priority determination processing executed by the priority determiner 105 will be explained with reference to FIG. 5.

An image for learning (hereinafter, referred to as a learning image) for which the position of the text line has already been ascertained in advance is prepared. For the learning image, the first text line detector 102 generates the first text line candidate by the first character detection scheme, and the second text line detector 103 generates the second text line candidate by the second character detection scheme. If the character detection scheme is the same, it is permissible to use the first text line candidate and the second text line candidate, which are processed in advance by the first character detection scheme and the second character detection scheme, instead of performing the processing by the first text line detection unit 102 and the second text line detection unit 103.

The priority determiner 105 calculates the matching rate between the first text line candidate and the text line whose position of the character string is ascertained in advance (hereinafter, referred to as a reference text line). In the same manner, the priority determiner 105 calculates the matching rate between the second text line candidate and the reference text line. As a result of comparing the matching rate calculated with respect to the first text line candidate and the matching rate calculated with respect to the second text line candidate, the text line candidate with a higher matching rate is considered as being processed by a scheme with high character detection accuracy. Therefore, the priority of such scheme will be set higher than that of the other scheme.

As the matching rate, a value obtained by dividing the area of a region in which the text line candidate and the reference text line are superimposed by the entire area of the text line candidate and the reference text line, may be used. The matching rate can be calculated, for example, by the following equation (1).

$$\text{Matching rate} = S(s1 \cap s2)/S(s1 \cup s2) \quad (1)$$

Here, S( ) is an area, s1 is a reference text line, s2 is a first text line candidate or a second text line candidate, $\cap$ is a product set, and $\cup$ is a sum set.

Figure 5:
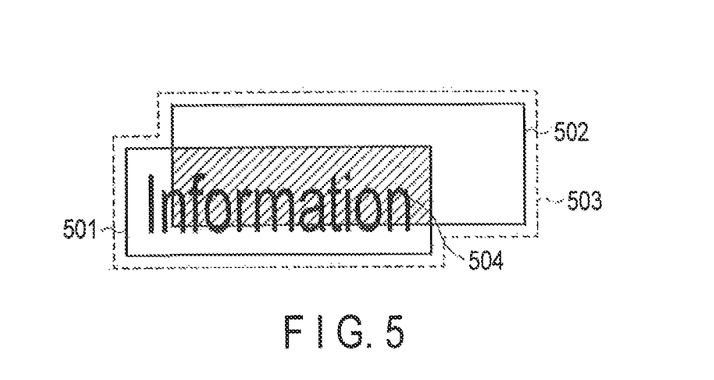
FIG. 5 is a diagram explaining a method of calculating a matching rate in a priority determiner.

In the example of FIG. 5, for example, when assuming the case of comparing the reference text line 501 and the first text line candidate 502, the matching rate becomes higher as a region 504 indicated by hatched lines becomes larger with respect to a region 503 indicated by dashed lines surrounding the entire area of the reference text line 501 and the first text line candidate 502.

For example, the feature extractor 104 calculates a feature value of the region of the reference text line in the learning image for determining priority, and the priority determiner 105 correlates the feature value with the priority. Therefore, by referring to the priority corresponding to the feature value that matches or is similar to the feature value of the region of the reference text line in accordance with the feature value of the image to be processed, it may be ascertained as to which of the schemes between the first character detection scheme and the second character detection scheme should be prioritized.

An example of correlating the character detection scheme and the feature value will be explained with reference to FIG. 6.

Figure 6:
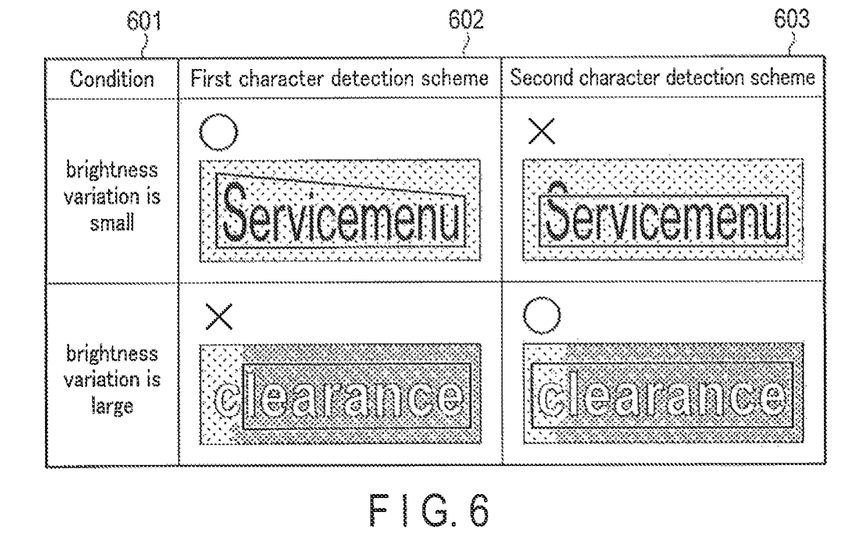
FIG. 6 is a diagram showing examples of correspondence between character detection schemes and feature values.

FIG. 6 shows the detection results of each of the first character detection scheme and the second character detection scheme under a condition 601. The condition 601 is a condition regarding a feature value. Here, a difference in luminance is assumed.

For example, in the case in condition 601 where a "luminance variation is small", the background and the character string, for example, are the same color, and the detection accuracy tends to become higher for the first character detection scheme 602 than for the second character detection scheme 603. However, in the case where "luminance variation is large" in condition 601, the character string is, for example, an outline character, and the detection accuracy tends to become higher for the second character detection scheme 603 than for the first character detection scheme 602.

Therefore, in the case of determining the priority of the character detection scheme with respect to the image to be processed, as a feature value, luminance distribution of each of the regions of the first text line candidate generated by the first character detection scheme 602 and the second text line candidate generated by the second character detection scheme 602 is calculated. In the case where the dispersion of the luminance distribution is equal to or greater than the threshold value, condition 601 "luminance variation is large" applies, and the priority of the second character detection scheme 603 is set high.

In the case where the dispersion of the luminance distribution is below the threshold value, condition 601 "luminance variation is small" applies, and the priority of the first character detection scheme 602 is set high. Instead of calculating the luminance of the region of each of the first text line candidate and the second text line candidate, it is also permissible to calculate the luminance of the entire image and refer to the luminance of the entire image. In this case, the feature extractor 104 receives the image from the image acquirer 101, and calculates the luminance of the entire image, which will be used when determining the priority.

Figure 7:
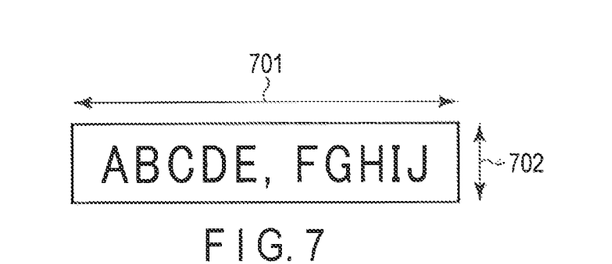
FIG. 7 is a diagram explaining the concept of a length and a width of a text line.

Furthermore, as a condition regarding the feature value, it is also permissible to use the length, the width, and the area of the text line candidate.

The concept of length 701 and width 702 of the text line candidate is shown in FIG. 7. As the length 701 of the text line becomes longer, the detection accuracy of the second character detection scheme becomes higher than the first character detection scheme. Accordingly, for example, as the feature value, the average length of the first text line candidate generated by the first character detection scheme, and the second text line candidate generated by the second character detection scheme, is calculated. In the case where the average length is equal to or greater than the threshold value, the priority of the second character detection scheme is set high. In the case where the average length is less than the threshold value, the priority of the first character detection scheme is set high.

Next, the integration processing executed by the integrator 106 is explained with reference to the flowchart of FIG. 8.

In step S801, it is determined whether or not the superimposition degree of the first text line candidate and the second text line candidate is equal to or greater than the threshold value. The superimposition degree may be calculated in the same manner as the method of calculating the matching rate between the first text line candidate and the reference text line, and calculating the matching rate between the second text line candidate and the reference text line in the priority determiner 105. Therefore the value obtained by dividing the area of a region in which the first text line candidate and the second text line candidate are superimposed by the entire area of the first text line candidate and the second text line candidate, may be used. In the case where the superimposition degree is equal to or greater than the threshold value, the processing proceeds on to step S802. In the case where the degree of superimposition is less than the threshold value, the processing proceeds on to step S803.

In step S802, the text line candidate generated by the character detection scheme with high priority is selected as the text line.

In step S803, the existence of an inclusive region, i.e., whether or not an inclusive relationship exists, is determined. The inclusive relationship is determined based on whether the second text line candidate is included in the first text line candidate or the first text line candidate is included in the second text line candidate. If the size of the superimposed region occupying the entire text line candidate of a smaller region (also referred to as minimum text line candidate) between the first text line candidate and the second text line candidate is equal to or greater than the threshold value, the inclusive relationship is determined to exist. If the inclusive region exists, the processing proceeds on to step S804. If an inclusive region does not exist, the operation proceeds on to step S805.

In step S804, between the text line candidates in an inclusive relationship, the text line candidate with a larger region (maximum text line candidate) is selected as a text line. For example, if the second text line candidate is included in the first text line candidate, the first text line candidate is selected as the text line.

In step S805, since the first text line candidate and the second text line candidate are not superimposed on each other, or the superimposed portion is smaller than the area in an inclusive relationship, both the first text line candidate and the second text line candidate are selected as the text lines. The integration processing is completed in the above manner.

An example of the integration processing result of the integrator 106 is explained with reference to FIG. 9.

FIG. 9(a) shows, in a state before integration, a case of generating both the first text line candidate and the second text line candidate with respect to the image to be processed and displaying them in one image. The dashed line indicates the first text line candidate 901, and the dashed-dotted line indicates the second text line candidate 902.

As shown in FIG. 9(a), in region 903 in the intermediary part of the image, the superimposition degree is equal to or greater than the threshold value. In region 904 in the lowest part of the image, the first text line candidate 901 is included in the second text line candidate 902, and is in an inclusive relationship with the second text line candidate 902. A case in which the first character detection scheme has a high priority is assumed.

As shown in FIG. 9(b), after the integration, in region 903, the first text line candidate 901 with high priority is selected as the text line since the superimposition degree is equal to or greater than the threshold value. In region 904, since the inclusive relationship exists, the second text line candidate 902 that has a larger region is selected as the text line.

Figure 10:
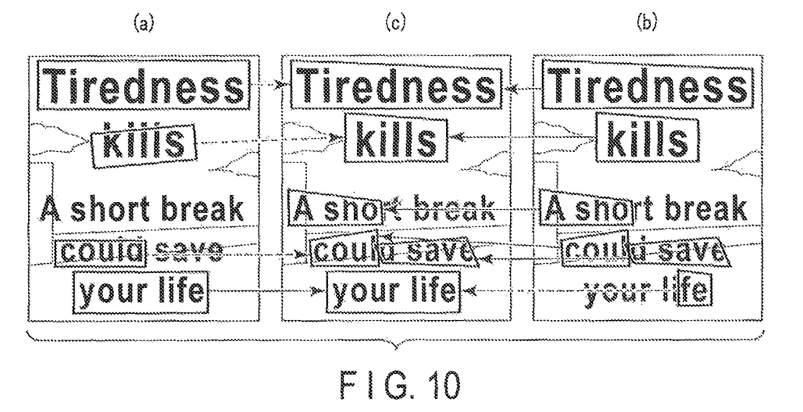
FIG. 10 is a diagram showing another example of the integration processing result obtained by the integrator.

Another example of the integration processing result will be explained with reference to FIG. 10.

FIG. 10(a) shows the second text line candidate, FIG. 10(b) shows the first text line candidate, and FIG. 10(c) shows the integration result.

Figure 9:
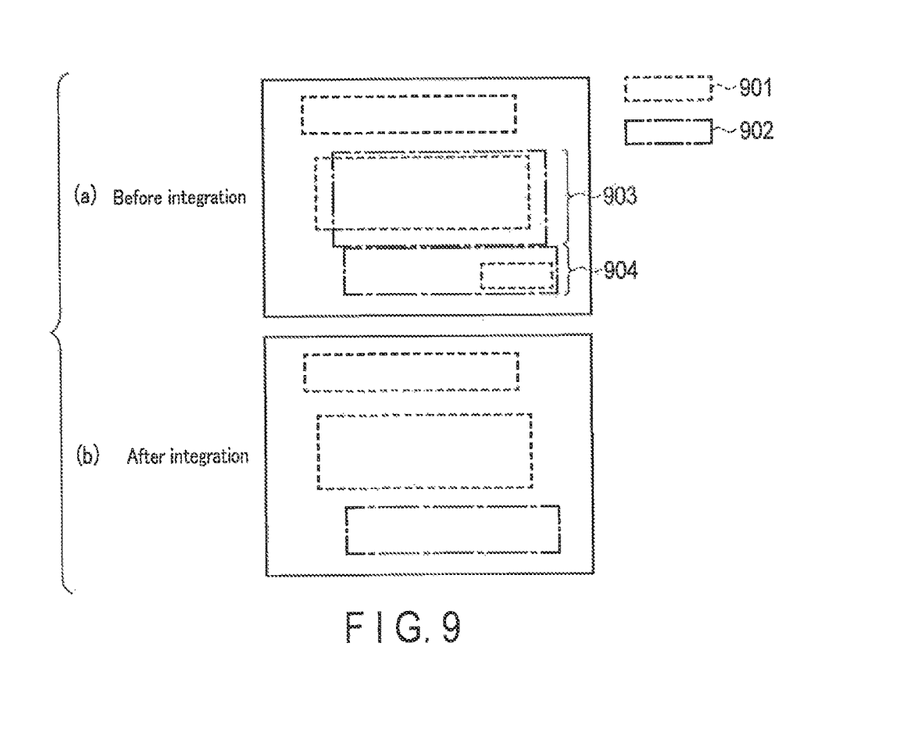
FIG. 9 is a diagram showing an example of an integration processing result obtained by the integrator.

As is the case for FIG. 9, for example, if the superimposition degree of the text line candidate of a character string "Tiredness" is equal to or greater than the threshold value, the first text line candidate shown in FIG. 10(b) with high priority will be selected as the text line. Also, for a character string "your life," since the first text line candidate is included in the second text line candidate, the second text line candidate, which is larger, will be selected as the text line.

The evaluation result of the detection accuracy will be explained with reference to FIG. 11.

Figure 11:
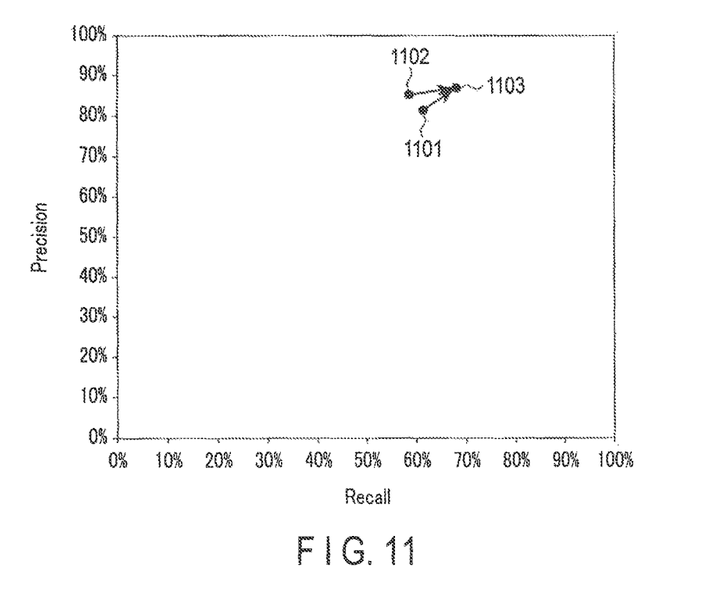
FIG. 11 is a graph showing an evaluation result of detection accuracy of the character detection apparatus.

The graph shown in FIG. 11 is a graph evaluating the detection accuracy according to the difference in methods of detecting text lines. The vertical axis indicates precision, and the horizontal axis indicates recall. Point 1101 indicates the case of using only the first character detection scheme. Point 1102 indicates the case of using only the second character detection scheme. Point 1103 indicates the case of processing by the character detection apparatus according to the present embodiment.

As shown in FIG. 11, in the first character detection scheme of point 1101, recall is approximately 62%, and precision is approximately 82%. In the second character detection scheme of point 1102, recall is approximately 59%, and precision is approximately 85%. According to the character detection apparatus of the present embodiment, recall is approximately 68%, and precision is approximately 87%, which indicates that the recall and the precision have both improved.

In the present embodiment, the case of detecting characters using the two schemes of the first character detection scheme and the second character detection scheme is assumed. However, it is also permissible to use three or more character detection schemes.

For example, in the priority determiner 105, in the case of using three or more character detection schemes, the matching rate between each of the plurality of character detection schemes and the reference text line is calculated, and the character detection scheme having the highest matching rate is determined to have the highest priority.

Figure 8:
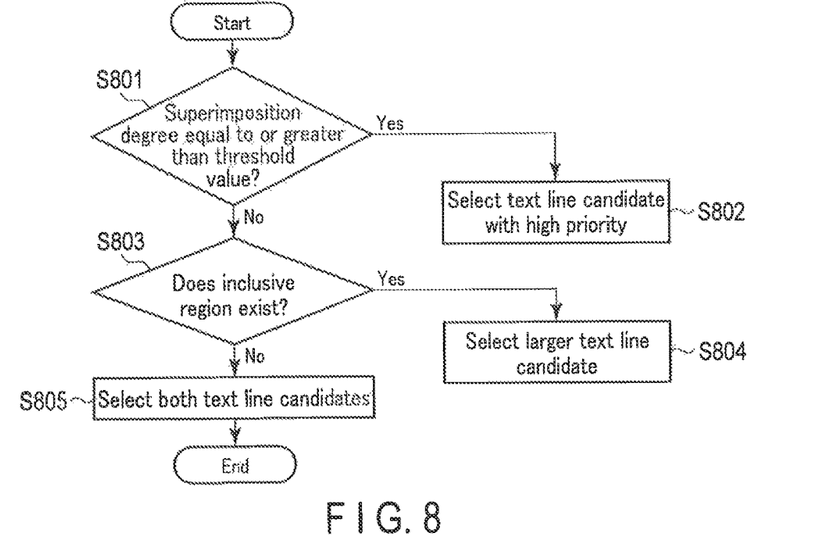
FIG. 8 is a flowchart showing an integration processing executed by an integrator.

The integrator 106 may also perform the same processing as in the flow chart shown in FIG. 8. For example, in step S801 shown in FIG. 8, in the case where a superimposed region exists among the text line candidates detected by each of the three or more character detection schemes, and the superimposition degree is equal to or greater than the threshold value, in step S802, the text line candidate detected by the character detection scheme with the highest priority should be selected as the text line.

In step S803, the text line candidate with the smallest region among the text line candidates detected by the plurality of character detection schemes is considered the minimum text line candidate. If the size of the region to be superimposed is equal to or greater than the threshold value with respect to the entire size of the minimum text line candidate, an inclusive relationship is determined to exist. In step S804, the text line candidate with the largest region among the text line candidates detected by the plurality of character detection schemes should be considered the maximum text line candidate and selected as the text line.

In step S805, each of the text line candidates detected by the plurality of character detection schemes should be selected as the text line.

According to the present embodiment described above, the priority of the character detection scheme is determined according to the feature value of the image, the text line candidates are detected from the image by using a plurality of character detection schemes, and the text line candidates are selected according to the priority in accordance with the feature value of the image and integrated to improve precision and recall of the text row for any kind of image.

The flow charts of the embodiments illustrate methods and systems according to the embodiments. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. A character detection apparatus, comprising:
   a memory; and
   processing circuitry configured to:
   extract a feature value of an image region including one or more character strings, wherein the feature value is a luminance or a length of the image region in a longitudinal direction;
   determine, based on the feature value, which one of a plurality of character detection schemes has a higher character detection accuracy for the image region; and
   select a text candidate region detected by the determined character detection scheme if a superimposition degree among a plurality of text candidate regions detected by the plurality of character detection schemes is no less than a first threshold;
   wherein
      if the superimposition degree is less than the first threshold and if an inclusive relationship exists, a maximum text line candidate having a largest region among superimposed text line candidates is selected as a text line, and
      if a ratio of a superimposed region occupying a minimum text line candidate is less than a second threshold value, each of the superimposed text line candidates is selected as a text line.

2. The apparatus according to claim 1, further comprising:
   the one or more character strings are detected using a first character detection scheme and a first text line candidate is obtained indicating a candidate of a region including the one or more character strings; and
   the one or more character strings are detected using a second character detection scheme and a second text line candidate is obtained indicating a candidate of a region including the one or more character strings,
   wherein a priority with respect to each of the first character detection scheme and the second character detection scheme is determined, a text line candidate detected by one of the first character detection scheme or the second character detection scheme with high priority if the superimposition degree relating to the first text line candidate and the second text line candidate is no less than the first threshold is selected as the text line.

3. The apparatus according to claim 2, wherein the processing circuitry is further configured to:
   connect pixels with similar features between adjacent pixels in the image region to obtain a plurality of connected components;
   generate the first text line candidate by combining the connected components in accordance with a similarity of the connected components and a positional relationship between the connected components;
   select one or more character candidate regions indicating a character candidate from the image region; and
   generate the second text line candidate by combining the one or more character candidate regions.

4. The apparatus according to claim 3, wherein the processing circuitry is further configured to:
   generate the first text line candidate by a line detection using the connected components, and
   generate the second text line candidate by a line detection using the one or more character candidate regions.

5. A character detection method, comprising:
   extracting a feature value of an image region including one or more character strings, wherein the feature value is a luminance or a length of the image region in a longitudinal direction;
   determining, based on the feature value, which one of a plurality of character detection schemes has a higher character detection accuracy for the image region; and
   selecting a text candidate region detected by the determined character detection scheme if a superimposition degree among a plurality of text candidate regions detected by the plurality of character detection schemes is no less than a first threshold;
   wherein
      if the superimposition degree is less than the first threshold, and if an inclusive relationship exists, selecting a maximum text line candidate having a largest region among superimposed text line candidates as a text line, and
      if a ratio of a superimposed region occupying a minimum text line candidate is less than a second threshold value, selecting each of the superimposed text line candidates as a text line.

6. The method according to claim 5, further comprising:
   first detecting the one or more character strings using a first character detection scheme and obtaining a first text line candidate indicating a candidate of a region including the one or more character strings;
   second detecting the one or more character strings using a second character detection scheme and obtaining a second text line candidate indicating a candidate of a region including the one or more character strings;
   determining a priority with respect to each of the first character detection scheme and the second character detection scheme;
   integrating the first text line candidate and the second text line candidate; and selecting, as the text line, a text line candidate detected by one of the first character detection scheme or the second character detection scheme with high priority if the superimposition degree relating to the first text line candidate and the second text line candidate is no less than the first threshold.

7. The method according to claim 6, wherein the first detecting comprises:
connecting pixels with similar features between adjacent pixels in the image region to obtain a plurality of connected components; and
first generating the first text line candidate by combining the connected components in accordance with a similarity of the connected components and a positional relationship between the connected components, and the second detecting comprises:
selecting one or more character candidate regions indicating a character candidate from the image region; and
second generating the second text line candidate by combining the one or more character candidate regions.

8. The method according to claim 7, wherein the first generating generates the first text line candidate by a line detection using the connected components, and the second generating generates the second text line candidate by a line detection using the one or more character candidate regions.

9. A non-transitory computer readable medium including computer executable instructions, wherein the instructions, when executed by a processor, cause the processor to perform a method comprising:
extracting a feature value of an image region including one or more character strings, wherein the feature value is a luminance or a length of the image region in a longitudinal direction;
determining, based on the feature value, which one of a plurality of character detection schemes has a higher character detection accuracy for the image region; and
selecting a text candidate region detected by the determined character detection scheme if a superimposition degree among a plurality of text candidate regions detected by the plurality of character detection schemes is no less than a first threshold;
wherein
if the superimposition degree is less than the first threshold, and if an inclusive relationship exists, selecting a maximum text line candidate having a largest region among superimposed text line candidates as a text line, and
if a ratio of a superimposed region occupying a minimum text line candidate is less than a second threshold value, the selecting each of the superimposed text line candidates as a text line.

10. The medium according to claim 9, further comprising:
first detecting the one or more character strings using a first character detection scheme and obtaining a first text line candidate indicating a candidate of a region including the one or more character strings;
second detecting the one or more character strings using a second character detection scheme and obtaining a second text line candidate indicating a candidate of a region including the one or more character strings;
determining a priority with respect to each of the first character detection scheme and the second character detection scheme;
integrating the first text line candidate and the second text line candidate; and
selecting, a text line candidate detected by one of the first character detection scheme or the second character detection scheme with high priority if the superimposition degree relating to the first text line candidate and the second text line candidate is no less than the first threshold.

11. The medium according to claim 10, wherein the first detecting comprises:
connecting pixels with similar features between adjacent pixels in the image region to obtain a plurality of connected components; and
first generating the first text line candidate by combining the connected components in accordance with a similarity of the connected components and a positional relationship between the connected components, and the second detecting comprises:
selecting one or more character candidate regions indicating a character candidate from the image region; and
second generating the second text line candidate by combining the one or more character candidate regions.

12. The medium according to claim 11, wherein the first generating generates the first text line candidate by a line detection using the connected components, and the second generating generates the second text line candidate by a line detection using the one or more character candidate regions.

* * * * *